US011755537B2

(12) United States Patent
Jain et al.

(10) Patent No.: US 11,755,537 B2
(45) Date of Patent: Sep. 12, 2023

(54) OPTIMIZING FILE ACCESS STATISTICS COLLECTION

(71) Applicant: VMware, Inc., Palo Alto, CA (US)

(72) Inventors: Abhay Kumar Jain, Palo Alto, CA (US); Wenguang Wang, Santa Clara, CA (US); Richard P. Spillane, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 55 days.

(21) Appl. No.: 17/202,342

(22) Filed: Mar. 15, 2021

(65) Prior Publication Data

US 2022/0292061 A1   Sep. 15, 2022

(51) Int. Cl.
| | |
|---|---|
| *G06F 17/00* | (2019.01) |
| *G06F 16/17* | (2019.01) |
| *G06F 21/62* | (2013.01) |
| *G06N 5/04* | (2023.01) |
| *G06N 20/00* | (2019.01) |

(52) U.S. Cl.
CPC ...... *G06F 16/1734* (2019.01); *G06F 21/6218* (2013.01); *G06N 5/04* (2013.01); *G06N 20/00* (2019.01)

(58) Field of Classification Search
CPC ... G06F 16/1734; G06F 21/6218; G06N 5/04; G06N 20/00
See application file for complete search history.

(56) References Cited

U.S. PATENT DOCUMENTS

| | | | | |
|---|---|---|---|---|
| 2008/0016021 | A1* | 1/2008 | Gulbeden | G06F 16/1734 |
| 2009/0150295 | A1* | 6/2009 | Hatch | G06Q 20/3552 |
| | | | | 705/76 |
| 2009/0276771 | A1* | 11/2009 | Nickolov | H04L 67/1008 |
| | | | | 718/1 |
| 2012/0109821 | A1* | 5/2012 | Barbour | G06Q 40/02 |
| | | | | 705/44 |
| 2013/0246622 | A1* | 9/2013 | Iliev | G06F 21/6218 |
| | | | | 709/225 |

OTHER PUBLICATIONS

Biswapesh Chattopadhyay et al., Procella: unifying serving and analytical data at YouTube. Proc. VLDB Endow. 12, Aug. 12, 2019, 2022-2034. <https://doi.org/10.14778/3352063.3352121>, Aug. 2019.*

* cited by examiner

*Primary Examiner* — Greta L Robinson
(74) *Attorney, Agent, or Firm* — Barta, Jones & Foley, PLLC (57) ABSTRACT

Optimizing file access includes a process for identifying a file access event for a first accessed file, and incrementing a first access counter in an access list in a memory, which also includes access counters for other accessed files. The process further includes exporting the first access counter to a performance monitoring dashboard, or exporting to a storage allocator and, based on the value, moving the first accessed file between a first storage and a second storage. The process also includes determining whether the value of the first access counter meets a first threshold, or a sum of values of the access counters for the other accessed files meets a second threshold. Based on meeting the first threshold or meeting the second threshold, the process includes persisting the access counters on a storage media. The access counters also provide security monitoring (e.g., identifying excessive file access).

20 Claims, 5 Drawing Sheets

OPTIMIZING FILE ACCESS STATISTICS COLLECTION

BACKGROUND

File analytics provides insight into file system usage and access patterns, which are useful for risk management and file access optimization. The quality of the file analytics depends on the file system providing relevant information (e.g., per-file access count). If the file system provides accurate read/write access count information, file analytics tools are able to generate trend information such as: most frequently accessed files, most frequently update files, most active volumes, a list of cold files, and a list of cold volumes.

Current solutions including retaining an identification of the top set of most heavily-accessed files and periodically providing this information to a file analytics utility and persisting access count information along with other file stat information. These approaches have drawbacks. Retaining identification of the top set of most heavily-accessed files does not address lesser-accessed files, so when one of the most heavily-accessed files is deleted, or access events abruptly cease, there is no information for which of the lesser-accessed files should take the empty spot. Additionally, in the event of a crash, reset, or power-down, the information is lost. Persisting access count information along with other file stat information introduces cumbersome overhead, as even a simple read operation adds a write operation when the on-disk stat information is updated. The use of a B-tree results in high write amplification, which is undesirable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide a solution for optimizing file access that includes: identifying a file access event for an accessed file; based on the file access event, incrementing an access counter for the accessed file in an access list in a memory, the access list comprising a plurality of access counters for a plurality of accessed files, the plurality of access counters including the access counter; exporting the access counter to: a performance monitoring dashboard, and displaying a value of the access counter for the accessed file; or a storage allocator, and based on at least the value of the access counter for the accessed file, moving the accessed file between one storage and another storage; determining whether: the value of the access counter for the accessed file meets a threshold; or a sum of values of the plurality of access counters for the plurality of accessed files meets another threshold; and based on that determination, persisting the plurality of access counters on a storage media. In some examples, the access counters also provide security monitoring (e.g., identifying excessive file access). In some examples, a shut-down process will also trigger persisting the plurality of access counters on the storage media.

BRIEF DESCRIPTION OF THE DRAWINGS

The present description will be better understood from the following detailed description read in the light of the accompanying drawings, wherein.

DETAILED DESCRIPTION

Aspects of the disclosure provide a solution for optimizing file access statistics collection. Aspects of the disclosure improve the speed of computing operations by reducing latency and write amplification for storing file access counts (or other file access statistics) used by file analytics, thereby improving the functioning of a computing device executing the computing operations. This is accomplished at least by incrementing access counters for accessed files in an access list in memory (instead of on a storage media), and persisting the access counters on a storage media based on intelligent thresholding of file access counts (e.g., determining whether the value of a first access counter for a first accessed file meets a first threshold, or a sum of values of a plurality of access counters for a plurality of accessed files meets a second threshold). This permits finding a storage-optimized way to store data about frequently accessed files (e.g., moving frequently-accessed files to a fast storage, and moving lesser-accessed (cold) files to long term storage). At least by persisting the access counters on the storage media only under certain conditions, write amplification is reduced, which reduces latency. In some examples, storing access counts for multiple files together provides locality for updating and accessing access count values, resulting in fewer metadata pages becoming dirty, further reducing write amplification.

Aspects of the disclosure improve the reliability of computing operations at least by persisting the plurality of access counters on the storage media in a manner that balances reducing write operations to disk (storing access counters in memory until either of two threshold conditions are met as described herein) versus the risk of a crash that loses access counts stored in memory. Persisting access counts too often incurs a cost, so the combination of the first threshold and the second threshold provide an optimized trade-off.

Aspects of the disclosure reduce the burden on file analytics operations, which provides insight into file system usage and access patterns that are useful for risk management and file access optimization. File analytics utilities do not need to scan all files on a storage media to determine which have changed, but instead need to determine which files have changed between two snapshots of persisted access data. Access count information may be exported to a dashboard and/or a file analytics utility as snapshots, provide read/write count information for all files whose access counts were updated since the prior expert event. This approach allows file analytics to have information about access counts for all files, efficiently. Exporting may include exporting a single access counter, or a set of access counters, and may be accomplished by assigning a value or passing a pointer (e.g., exporting the access counter by reference).

Additional practical applications of the disclosure include applying the file access counts for multiple purposes, including moving heavily-accessed files onto fast storage (e.g., for high availability), moving cold files to more cost-effective long term storage, load balancing, and others. In some examples, snapshot differences (diffs) are exported between 2 snapshots, which indicate changes between snapshots (rather than exporting the entirety of the snapshots themselves). File analytics may use this feature for efficiency, to avoid scanning an entire file system for changes. If, between the two snapshots only 100 files have been changed, the file analytics will scan only those 100 files. This same mechanism is leveraged for exporting access count information to provide read/write count information for all files whose access counts were updated between the two snapshots.

Figure 1:
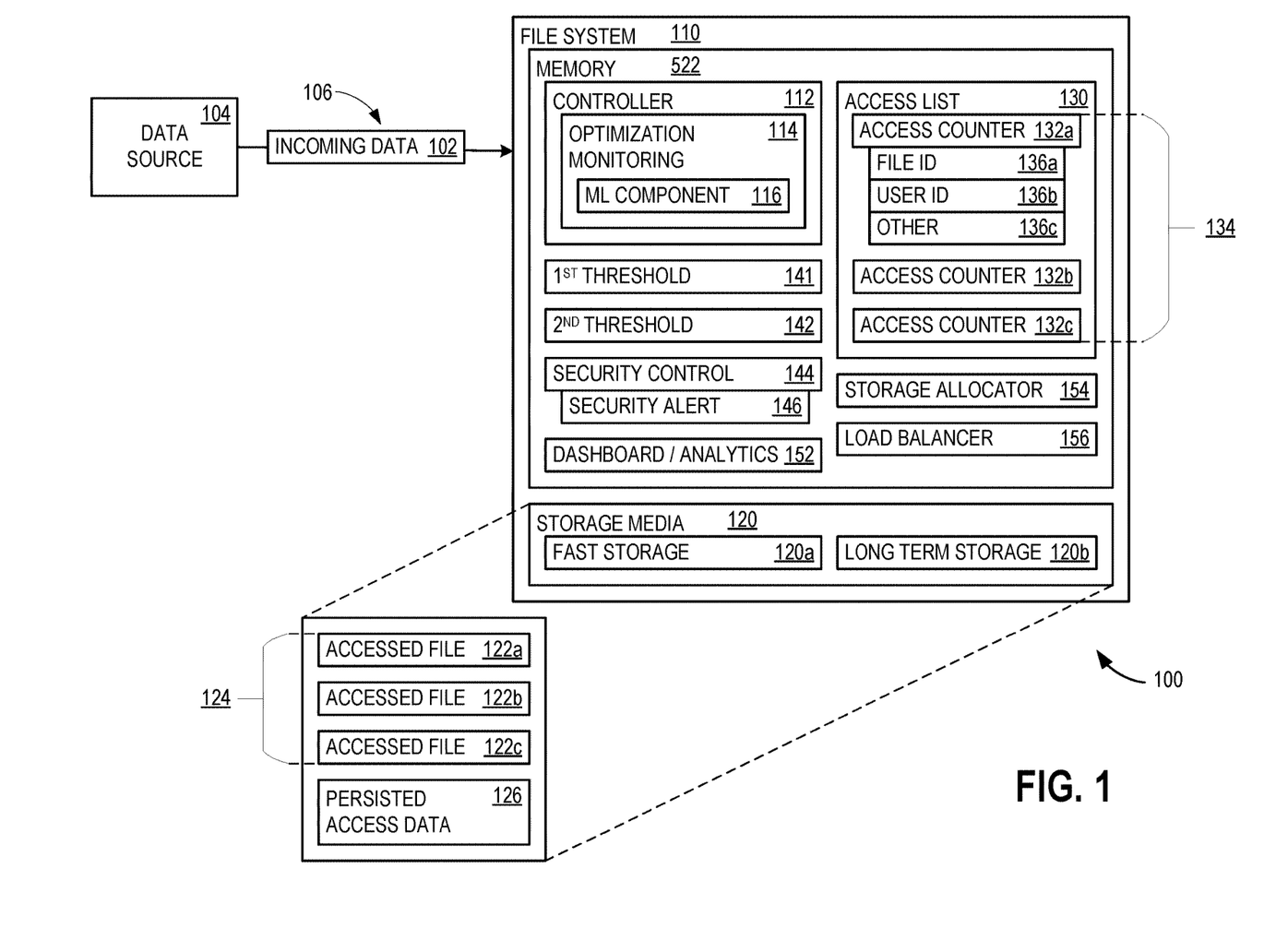
FIG. 1 illustrates an architecture that advantageously optimizes file access.

FIG. 1 illustrates an architecture 100 that may advantageously optimize file access. In some examples, architecture 100 is implemented on one or more computing apparatus 518 of FIG. 5. A file system 110 receives incoming data 102 from a data source 104, which may be a remote node or may be within the same computing device as file system 110. In some examples, data source 104 is a remote node. Receiving incoming data 102 for storage is an example of a file access event 106 (e.g., a file input/output (I/O)), specifically a file write. Other types of file access event 106 include a file read and a file deletion. Initially, incoming data 102 comes into a memory 522, which is described in further detail in relation to FIG. 5, but is written to a storage media 120 as an accessed file 122a. In some examples, storage media 120 comprises a plurality of solid state drives (SSDs) or magnetic disks.

Data source 104 (or other data sources) may access other files on storage media 120 with additional file access events 106, such as file writes, file reads, and/or file deletions. A plurality of accessed files 124, accessed with additional file access events 106, includes an accessed file 122b and an accessed file 122c (in addition to accessed file 122a). Storage media 120 may comprise multiple physical media hardware devices, located in dispersed physical locations, and may be segmented by access speed and access cost into a first storage (e.g., a fast storage 120a) portion and a second storage (e.g., a long term storage 120b) portion. For example, fast storage 120a may be configured and located to provide quicker reading, writing, and deletion operations, whereas long term storage 120b may provide more cost-effective storage, possibly at the expense of slower reading, writing, and deletion operations. In some examples, optimizing file access includes determining which of accessed files 122a-122c should be placed on which one of fast storage 120a and long term storage 120b, and moving an accessed file 122a, 122b, or 122c between fast storage 120a and long term storage 120b when warranted by the number (e.g., quantity) or rate of access events, relative to other files.

In order to ascertain the number or rate of access events for accessed files 122a-122c, relative to other files, a controller 112 keeps an access list 130 (e.g., a stat structure) in memory 522 and, upon certain conditions identified below, persists at least some information from access list 130 on storage media 120 in persisted access data 126. Persisting includes, for example, transmitting, sending, flushing, or otherwise making available at least some information from access list 103 to storage media 120. Access list 130 comprises a plurality of access counters 134 for plurality of accessed files 124. Plurality of access counters 134 includes an access counter 132a for accessed file 122a, an access counter 132b for accessed file 122b, and an access counter 132c for accessed file 122c. Access counters 132a-132c store values that count file access events 106 for each of accessed files 122a-122c, except for file deletions. In the event that file access event 106 comprises a file deletion, the access counter for the deleted file is removed from access list 130, because it is no longer needed.

Access list 130 may contain additional information, such as a file identification (ID) 136a (of the file being accesses), a user identification 136b (of the user accessing the file), and other information 136c, for example a count of file access denials for the file. Although such information fields are shown as associated with access counter 132a, it should be understood that equivalent information fields may also be associated with access counters 132b and 132c. That is, in some examples, access list 130 (e.g., stored as a stat structure) is interspersed with other file metadata such as extent, directory entry, hard link information and extended attributes. In some examples, access list 130 is stored as a single structure. In some examples, access list 130 is stored as a plurality of structures, for example one or more structures at each compute node, for a distributed computing environment. In some examples, each access counter requires 32 bytes, so an 8 kilobyte (KB) page may contain up to 256 access counters. In some examples, access list 130 also stores a count of the number of files that have been deleted by a particular user. Such information may be useful in identifying a security incident, such as ransomware that exfiltrates or encrypts files and deletes remaining unencrypted (cleartext) copies. As described below, in some examples, a security control 144 is triggered to examine values within access list 130, under certain conditions.

In operation, controller 112 increments whichever one of access counters 132a-132c corresponds to whichever one of accessed files 122a-122c is the subject of file access event 106. Access counters 132a-132c are held in memory 522, for rapid update, thereby precluding long latency. Controller 112 checks access counters 132a-132c against two thresholds, a first threshold 141 and a second threshold 142. If controller 112 determines that the value of any single one of access counters 132a-132c meets (or exceeds) first threshold 141, at least that access counter is persisted on storage media 120 in persisted access data 126. In some examples, if a single one of access counters 132a-132c meets (first threshold 141, all access counters (e.g., plurality of access counters 134) are persisted on storage media 120. In some examples, first threshold 141 is set to a value of 200. Persisted access data 126 may be stored as metadata for each of accessed files 122a-122c, with each portion of persisted access data 126 that is relevant for each individual file stored with that file, or may be stored in a dedicated location or set of locations specifically reserved for file access information.

Alternatively, if controller 112 determines that the sum of the values of the plurality of access counters 134 (e.g., the value of access counter 132a plus the value of access counter 132b plus the value of access counter 132c) meets (or exceeds) a second threshold 142, plurality of access counters 134 is persisted on storage media 120 in persisted access data 126. Thus, at least two triggers are used: a single one of accessed files has enough access events that its access counter meets first threshold 141, and that a set of accessed files cumulatively has enough access events that their access counters sum to meet second threshold 142. In some examples, second threshold 142 is set to a value of 1000 or greater (e.g., 1024). Because access list 130 is stored in memory 522 (to reduce latency), and memory 522 may be volatile memory, there is a possibility that access list 130 will be lost when a computing apparatus that holds memory 522 is shutting down. In some examples, controller 112 also persists plurality of access counters 134 on storage media 120 if controller 112 determines that a computing apparatus that holds memory 522 is shutting down.

A performance monitoring dashboard 152 displays values of one or more of access counters 132a-132c, and provides file analytics functionality to a user for optimizing file access. In some examples, a storage allocator 154 determines whether an accessed file should be on fast storage 120a or long term storage 120b, based on (at least) the number or rate of access events, relative to other files. That is, storage allocator 154 determines which of accessed files 122a-122c should be placed on which one of fast storage 120a and long term storage 120b, and moves an accessed file 122a, 122b, or 122c between fast storage 120a and long term storage 120b when warranted. In some examples, a load balancer 156 moves an accessed file 122a, 122b, or 122c, based on access events, for example, moving an accessed file 122a, 122b, or 122c from one storage node to another, in order to balance access events among different storage nodes.

A security control 144 may be triggered by repeated access denials, such as a count of file access denials for the file, or a particular user deleting some threshold number of files. In some examples, a high count of file deletions or file movement (which may be indicators of ransomware or other malicious activity) trigger security control 144. Some examples use access counters 132a-132c as an initial trigger (against either first threshold 141 or second threshold 142) to trigger an examination of the type of access events (e.g., to determine whether access events are the type associated with problematic activity). Some examples use a separate security threshold for problematic access types (e.g., file deletions) for generating a security alert. When triggered, and file access events indicate a possible security incident, security control 144 generates a security alert 146. In some examples, controller 112 also includes an optimization monitor 114 to fine-tune first threshold 141 and/or second threshold 142, based on ongoing performance monitoring. In some examples, optimization monitor 114 uses artificial intelligence (AI) and/or machine learning (ML), collectively ML, to monitor performance and adjust first threshold 141 and/or second threshold 142.

Figure 2:
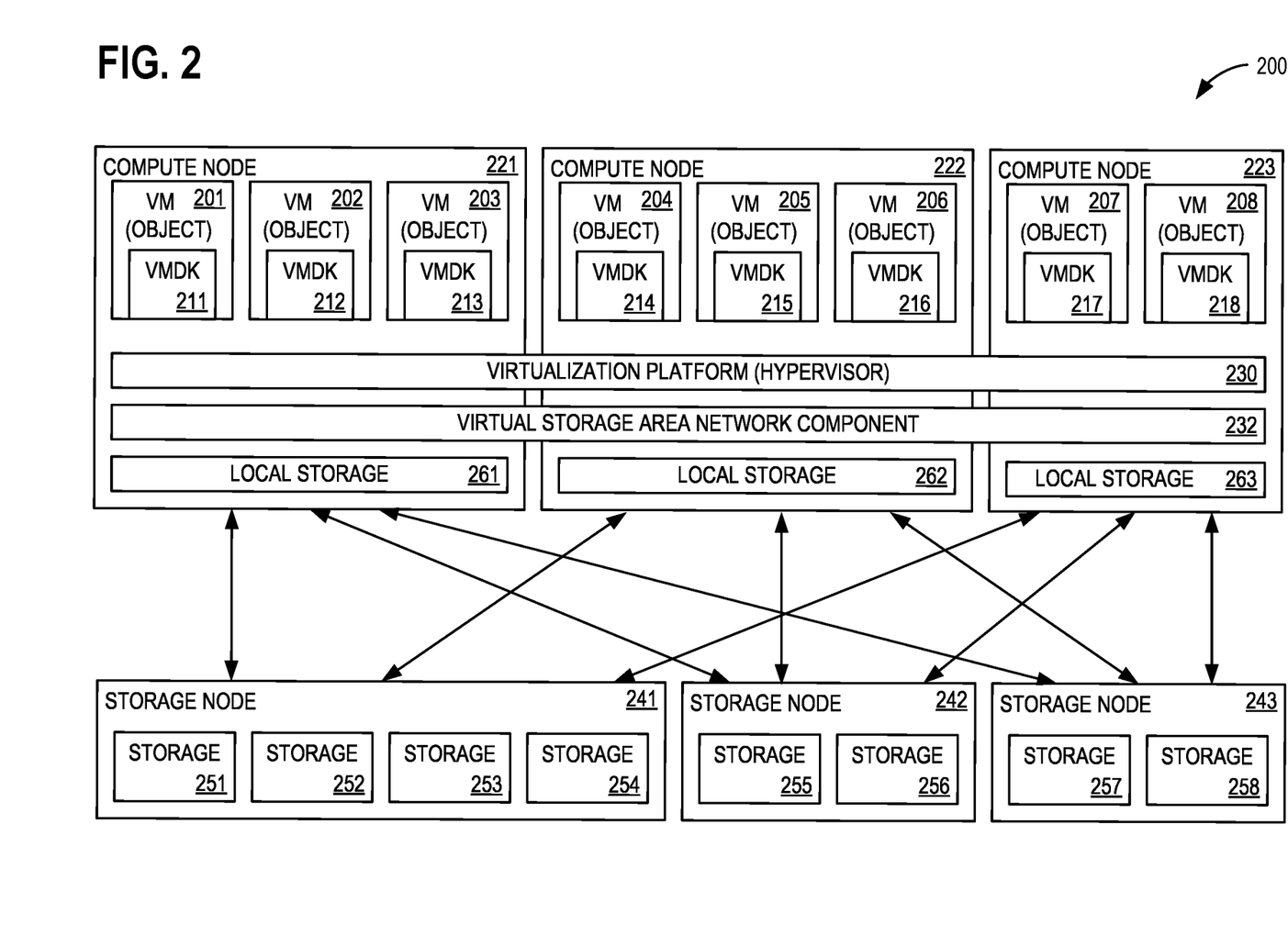
FIG. 2 illustrates further detail some examples of the architecture of FIG. 1.

Architecture 100 is operable with both virtualized and non-virtualized storage solutions. FIG. 2 illustrates a virtualization architecture 200 that may be used as a version of file system 110 and data source 1-4, in some examples of architecture 100. As noted above storage node 241 may be used as fast storage 120a, while storage nodes 242 and/or 243 may be used as long term storage 120b.

Virtualization architecture 200 is comprised of a set of compute nodes 221-223 interconnected with each other and a set of storage nodes 241-243 according to an embodiment. In other examples, a different number of compute nodes and storage nodes may be used. Each compute node hosts multiple objects, which may be virtual machines (VMs), containers, applications, or any compute entity that can consume storage. When objects are created, they are designated as global or local, and the designation is stored in an attribute. For example, compute node 221 hosts objects 201, 202, and 203; compute node 222 hosts objects 204, 205, and 206; and compute node 223 hosts objects 207 and 208. Some of objects 201-208 are local objects. In some examples, a single compute node may host 50, 100, or a different number of objects. Each object uses a virtual machine disk (VMDK), for example VMDKs 211-218 for each of objects 201-208, respectively. Other implementations using different formats are also possible. A virtualization platform 230, which includes hypervisor functionality at one or more of computer nodes 221, 222, and 223, manages objects 201-208. In some examples, various components of virtualization architecture 200, for example compute nodes 221, 222, and 223, and storage nodes 241, 242, and 243 are implemented using one or more computing apparatus 518 of FIG. 5.

Virtualization software that provides software-defined storage (SDS), by pooling storage nodes across a cluster, creates a distributed, shared data store, for example a storage area network (SAN). In some distributed arrangements, servers are distinguished as compute nodes (e.g., compute nodes 221, 222, and 223) and storage nodes (e.g., storage nodes 241, 242, and 243). Although a storage node may attach a large number of storage devices (e.g., flash, solid state drives (SSDs), non-volatile memory express (NVMe), Persistent Memory (PMEM), quad-level cell (QLC)) processing power may be limited beyond the ability to handle input/output (I/O) traffic. During data writes to storage devices, a phenomenon termed write amplification may occur, in which more data is written to the physical media than was sent for writing in the I/O. Write amplification is an inefficiency that produces unfavorable I/O delays and may arise as a result of synchronization between mirrored components to bring a stale component up to date, as described herein.

Storage nodes 241-243 each include multiple physical storage components, which may include flash, SSD, NVMe, PMEM, and QLC storage solutions. For example, storage node 241 has storage 251, 252, 252, and 254; storage node 242 has storage 255 and 256; and storage node 243 has storage 257 and 258. In some examples, a single storage node may include a different number of physical storage components. In the described examples, storage nodes 241-243 are treated as a SAN with a single global object, enabling any of objects 201-208 to write to and read from any of storage 251-258 using a virtual SAN component 232. Virtual SAN component 232 executes in compute nodes 221-223. Thin-provisioning may be used, and in some examples, storage nodes 241-243 do not require significantly more processing power than is needed for handling I/O traffic. This arrangement may be less expensive than in an alternative hyper-converged environment in which all of storage nodes 241-243 have the same or similar processing capability as compute node 221. Using the disclosure, compute nodes 221-223 are able to operate with a wide range of storage options.

In some examples, compute nodes 221-223 each include a manifestation of virtualization platform 230 and virtual SAN component 232. Virtualization platform 230 manages the generating, operations, and clean-up of objects 201 and 202. Virtual SAN component 232 permits objects 201 and 202 to write incoming data from object 201 and incoming data from object 202 to storage nodes 241, 242, and/or 243, in part, by virtualizing the physical storage components of the storage nodes.

Figure 3:
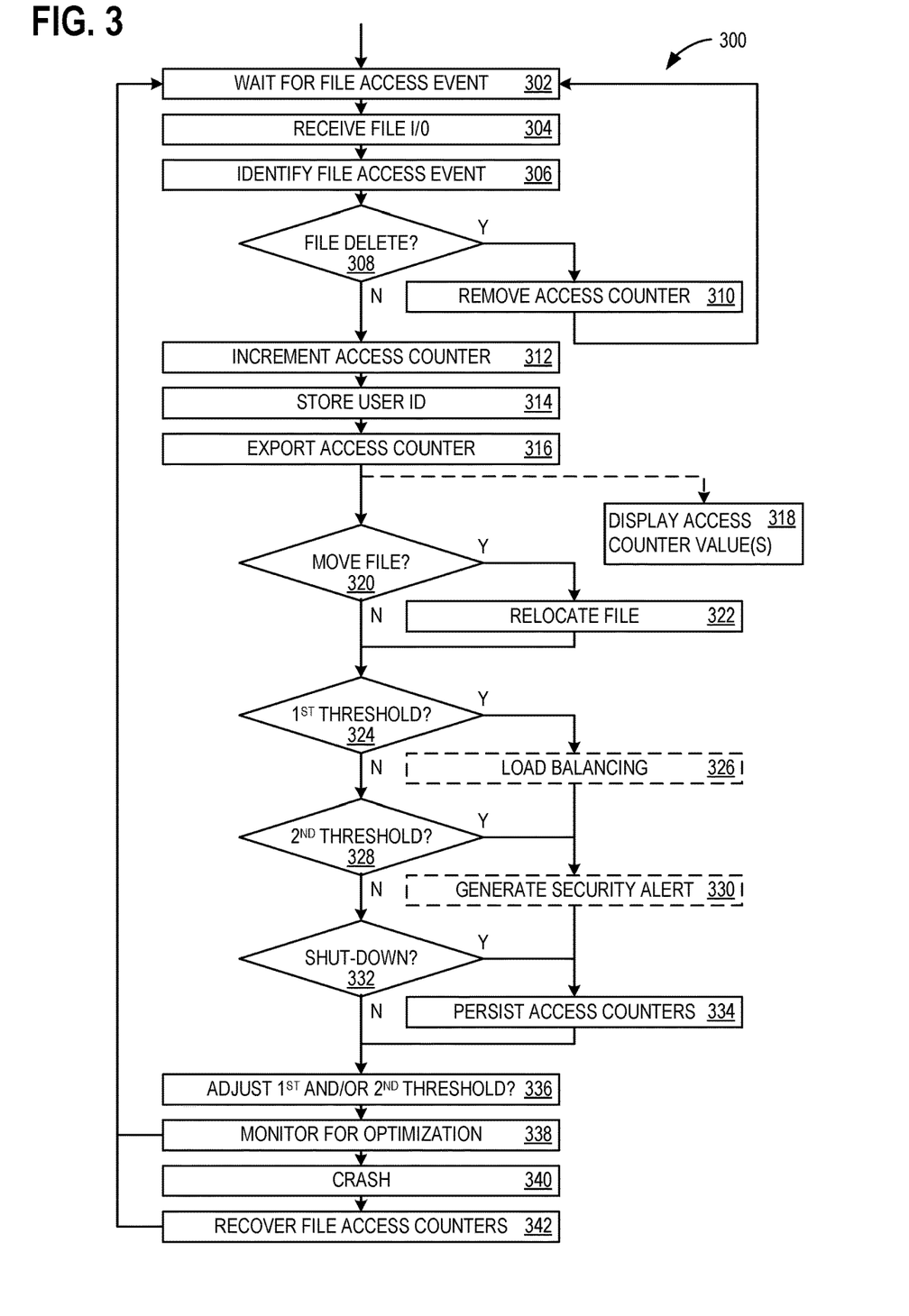
FIG. 3 illustrates a flowchart of exemplary operations, associated with the architecture of FIG. 1, for optimizing file access.

FIG. 3 illustrates flowchart 300 of exemplary operations associated with optimizing file access. In some examples, the operations of flowchart 300 are performed by one or more computing apparatus 518 of FIG. 5, which correspond to a file system in some examples. Operation 302 includes waiting for file access event 106, which is received at 304. Operation 306 includes identifying file access event 106 for accessed file 122a, for example incoming data 102 is to be stored in accessed file 122a with a file write. Operation 306 identifies which file (e.g., file ID 136a) is being accessed and the type of file access. Decision operation 308 determines whether file access event 106 for accessed file 122a comprises a file deletion. If so, operation 310 includes, based on at least file access event 106 for accessed file 122a comprising a file deletion, removing access counter 132a from access list 130. Flowchart 300 then returns to 302.

Otherwise, the proper access counter is incremented. To accomplish this, operation 312 includes, based on at least file access event 106, incrementing access counter 132a for accessed file 122a in access list 130 in memory 522, access list 130 comprising plurality of access counters 134 for plurality of accessed files 124, plurality of access counters 134 including access counter 132a. Operation 314 includes storing user ID 136b and/or a count of file access denials (e.g. as other information 136c) in access list 130. Operation 316 includes exporting access counter 132a to performance monitoring dashboard 152 and/or storage allocator 154 (e.g., a storage allocation component). In some examples, operation 316 also includes exporting access counter 132a to load balancer 156 and/or security control 144. Exporting access counter 132a includes transmitting, sending, or otherwise making available the value in access counter 132a to another logical operation e.g., by assigning a value or passing a pointer.) In some examples, operation 316 passes only a single access counter. In some examples, operation 316 passes a set of multiple access counters. In some examples, operation 316 passes the entirety of access list 316. Operation 318 includes displaying a value of access counter 132a for accessed file 122a (and multiple other files, in some examples) on performance monitoring dashboard 152, for example as a number or a graphical indicator (e.g., bar graph, line graph, meter, or other indicator). This shows a user which files are most accessed and most modified.

A decision operation 320 determines whether storage allocator 154 will move accessed file 122a between fast storage 120a and long term storage 120b, for example moving more frequently-accessed files to fast storage 120a and moving cold files to long term storage 120b. If so, relocate operation 322 includes, based on at least the value of access counter 132a for accessed file 122a, moving accessed file 122a between fast storage 120a and long term storage 120b. A decision operation 324 determines whether the value of access counter 132a for accessed file 122a meets first threshold 141. Operation 326 includes, based on at least the value of access counter 132a for accessed file 122a meeting the first threshold, performing a load balancing operation for an application accessing accessed file 122a. In some examples, operation 326 is also triggered by the sum of values of plurality of access counters 134 for plurality of accessed files 124 meeting second threshold 142.

Decision operation 328 determines whether the sum of values of plurality of access counters 134 for plurality of accessed files 124 meets second threshold 142. If so, operation 330 generates security alert 146. Operation 330 may be reached via decision operation 324 or decision operation 328. Thus operation 330 includes, based on at least the value of access counter 132a for accessed file 122a meeting first threshold 141, or based on at least the sum of values of plurality of access counters 134 for plurality of accessed files 124 meeting second threshold 142, generating security alert 146. In some examples, different security-specific thresholds (rather than first threshold 141 and/or second threshold 142) are used to trigger operation 330. In some examples, decision operation 332 determines whether a computing apparatus comprising memory 522 is shutting down. If, so flowchart 300 moves to operation 334 to persist plurality of access counters 134 to storage media 120 in persisted access data 126.

Operation 334 may be reached by decision operation 324 or 328, or (in some examples) decision operation 332. Thus, operation 334 includes 334, based on at least the value of access counter 132a for accessed file 122a meeting first threshold 141 or, based on at least the sum of values of plurality of access counters 134 for plurality of accessed files 124 meeting second threshold 142 or, (in some examples) based on at least the computing apparatus comprising the memory shutting down, persisting plurality of access counters 134 on storage media 120. In some examples, if only a single accessed file had sufficient file access events that first threshold 141 was met, only that file's corresponding access counter is persisted to storage media 120.

It should be understood that the illustration of operations 324-334 is notional, and should not be interpreted as requiring the three decisions to be made in any particular order, or even sequentially. In some examples, decision operations 324, 328, and 332 may be made in parallel. Decision operation 324 (first threshold 141 is met) acts as a trigger for operation 334 (e.g., persisting access counters) and may optionally trigger operation 326 (load balancing) and/or operation 330 (generating a security alert). Decision operation 328 (second threshold 142 is met) also acts as a trigger for operation 334 (e.g., persisting access counters) and may also optionally trigger operation 330 (generating a security alert)—although, in some examples, operation 326 (load balancing) may also optionally be triggered. Optional decision operation 332 (shut-down pending) also acts as a trigger for operation 334 (e.g., persisting access counters) but may not be associated with load balancing or security alerts.

In order to provide ongoing, improving file optimization, some examples adjust first threshold 141 and/or second threshold 142 so that operations 326, 330, and/or 334 are triggered either sooner or later. Thus, operation 336 includes adjusting first threshold 141 or second threshold 142 to rebalance a computational burden of persisting plurality of access counters 134 on storage media 120 versus a risk of losing access list 130 in memory 522 (e.g., due to a crash). In some examples, this operation 338 includes monitoring, with ML component 116 the rebalancing of the computational burden, wherein adjusting first threshold 141 or second threshold 142 comprises adjusting first threshold 141 or second threshold 142 with ML component 116. For example, the first threshold 141 and/or the second threshold 142 are optimized based on empirical data relating to server crashes.

Flowchart 300 returns to operation 302 to wait for the next file access event (e.g., another file access event 106) unless there is a crash at 340. In the event of a crash, a restore operation 342 recollects file access information from persisted access data 126 to repopulate access list 130.

Figure 4:
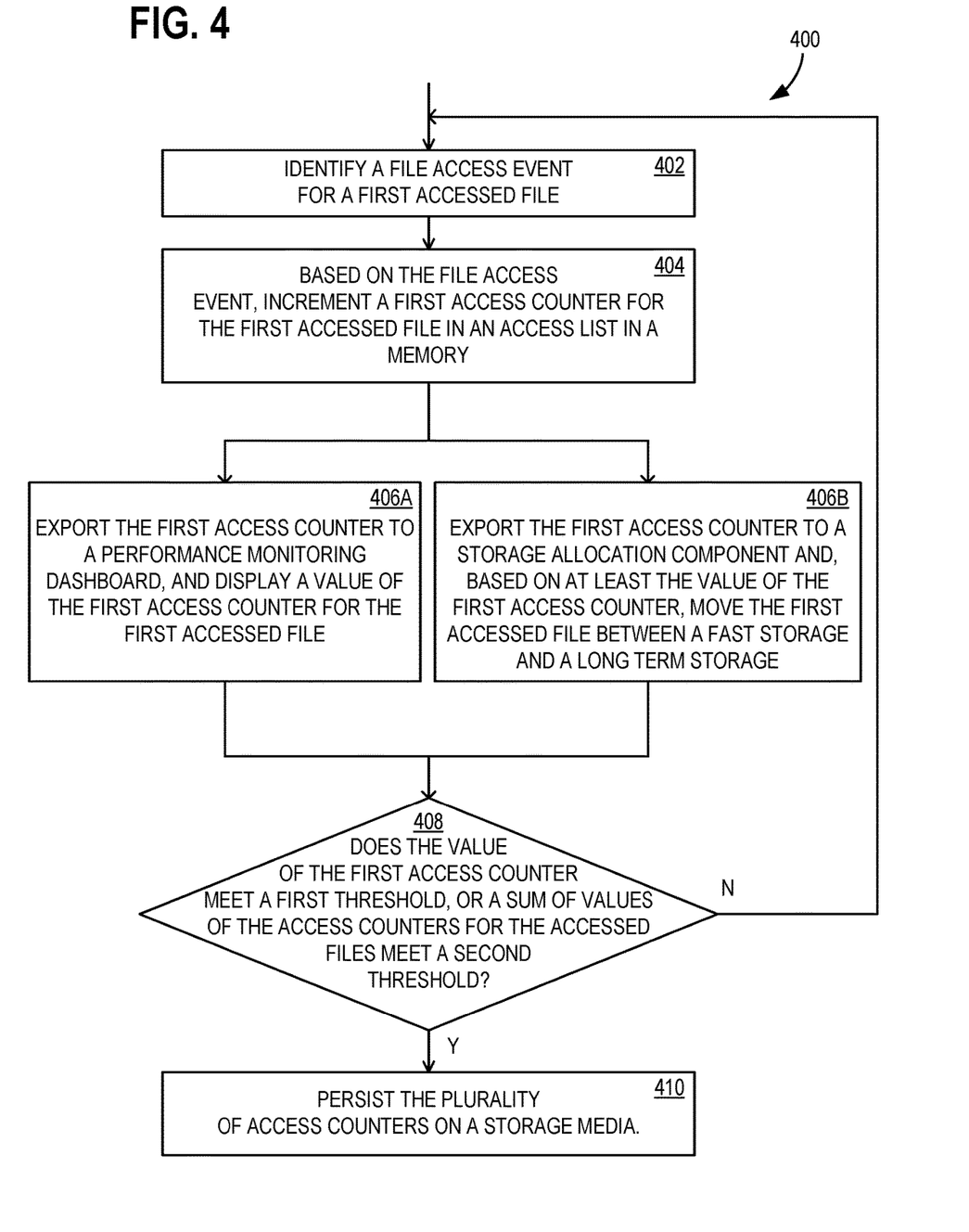
FIG. 4 illustrates another flowchart of exemplary operations, associated with the architecture of FIG. 1, for optimizing file access.

FIG. 4 illustrates a flowchart 400 of exemplary operations associated with optimizing file access. In some examples, the operations of flowchart 400 are performed by one or more computing apparatus 518 of FIG. 5, which correspond to a file system in some examples. Operation 402 includes identifying a file access event for a first accessed file. Operation 404 includes, based on at least the file access event, incrementing a first access counter for the first accessed file in an access list in a memory, the access list comprising a plurality of access counters for a plurality of accessed files, the plurality of access counters including the first access counter. Operation 406A includes exporting the first access counter to: a performance monitoring dashboard, and displaying a value of the first access counter for the first accessed file. Operation 406B includes exporting the first access counter to a storage allocator, and based on at least the value of the first access counter for the first accessed file, moving the first accessed file between a fast storage and a long term storage. Operation 408 includes determining whether: the value of the first access counter for the first accessed file meets a first threshold; or a sum of values of the plurality of access counters for the plurality of accessed files meets a second threshold. If either threshold is met, processing continues at operation 410. Operation 410 includes, based on at least the value of the first access counter for the first accessed file meeting the first threshold, or the sum of values of the plurality of access counters for the plurality of accessed files meeting the second threshold, persisting the plurality of access counters on a storage media. Otherwise, if neither threshold is met in operation 408, processing continues with the next file access event at 402.

Additional Examples

Some aspects of the disclosure include cleanup operations. For example, when a file gets deleted, the corresponding access count info is removed. This helps ensure that access count entries do not grow unbounded.

Some examples of the disclosure can be used to store other file information, such as which user is associated with a particular access count. This other file information may be stored using a hook or callback function, along with the rest of the file information. Other file information that may be stored includes access denied information (e.g., if a request was not successful). Still other file information that may be stored includes a count of a quantity of files that have been deleted by a user. The count may be compared to a threshold, for security reasons. If the count exceeds the threshold (e.g., over an amount of time), those operations may be flagged as suspicious (e.g., possible malware), and trigger the performance of remediation operations. These kind of security operations may be performed on home volumes accessed by a single user. Alternatively or in addition, aspects of the disclosure compare access count and file identify information across users and volumes to unusual activity.

An example method of optimizing file access comprises: identifying a file access event for a first accessed file; based on at least the file access event, incrementing a first access counter for the first accessed file in an access list in a memory, the access list comprising a plurality of access counters for a plurality of accessed files, the plurality of access counters including the first access counter; exporting the first access counter to: a performance monitoring dashboard, and displaying a value of the first access counter for the first accessed file; or a storage allocator, and based on at least the value of the first access counter for the first accessed file, moving the first accessed file between a fast storage and a long term storage; determining whether: the value of the first access counter for the first accessed file meets a first threshold; or a sum of values of the plurality of access counters for the plurality of accessed files meets a second threshold; and based on at least the value of the first access counter for the first accessed file meeting the first threshold, or the sum of values of the plurality of access counters for the plurality of accessed files meeting the second threshold, persisting the plurality of access counters on a storage media.

An example computer system comprises: a processor; and a non-transitory computer readable medium having stored thereon program code, the program code causing the processor to: identify a file access event for a first accessed file; based on at least the file access event, increment a first access counter for the first accessed file in an access list in a memory, the access list comprising a plurality of access counters for a plurality of accessed files, the plurality of access counters including the first access counter; export the first access counter to: a performance monitoring dashboard, and display a value of the first access counter for the first accessed file; or a storage allocator, and based on at least the value of the first access counter for the first accessed file, move the first accessed file between a fast storage and a long term storage; determine whether: the value of the first access counter for the first accessed file meets a first threshold; or a sum of values of the plurality of access counters for the plurality of accessed files meets a second threshold; and based on at least the value of the first access counter for the first accessed file meeting the first threshold, or the sum of values of the plurality of access counters for the plurality of accessed files meeting the second threshold, persist the plurality of access counters on a storage media.

An example non-transitory computer storage medium has stored thereon program code executable by a processor, the program code embodying a method comprising: identifying a file access event for a first accessed file; based on at least the file access event, incrementing a first access counter for the first accessed file in an access list in a memory, the access list comprising a plurality of access counters for a plurality of accessed files, the plurality of access counters including the first access counter; exporting the first access counter to: a performance monitoring dashboard, and displaying a value of the first access counter for the first accessed file; or a storage allocator, and based on at least the value of the first access counter for the first accessed file, moving the first accessed file between a fast storage and a long term storage; determining whether: the value of the first access counter for the first accessed file meets a first threshold; or a sum of values of the plurality of access counters for the plurality of accessed files meets a second threshold; and based on at least the value of the first access counter for the first accessed file meeting the first threshold, or the sum of values of the plurality of access counters for the plurality of accessed files meeting the second threshold, persisting the plurality of access counters on a storage media.

Alternatively, or in addition to the other examples described herein, examples include any combination of the following:
- determining whether the file access event for the first accessed file comprises a file deletion;
- based on at least the file access event for the first accessed file comprising a file deletion, removing the first access counter from the access list;
- determining whether a computing apparatus comprising the memory is shutting down;
- based on at least the computing apparatus comprising the memory shutting down, persisting the plurality of access counters on the storage media;
- based on at least the value of the first access counter for the first accessed file meeting the first threshold, performing a load balancing operation for an application accessing the first accessed file;
- based on at least the value of the first access counter for the first accessed file meeting the first threshold, or the sum of values of the plurality of access counters for the plurality of accessed files meeting the second threshold, generating a security alert;
- adjusting the first threshold or the second threshold to rebalance a computational burden of persisting the plurality of access counters on the storage media versus a risk of losing the access list in the memory;

monitoring, with an ML component, the rebalancing of the computational burden, wherein adjusting the first threshold or the second threshold comprises adjusting the first threshold or the second threshold with the ML component;

storing a user identification and/or a count of file access denials in the access list; and the storage media comprises a plurality of magnetic disks.

Exemplary Operating Environment

Figure 5:
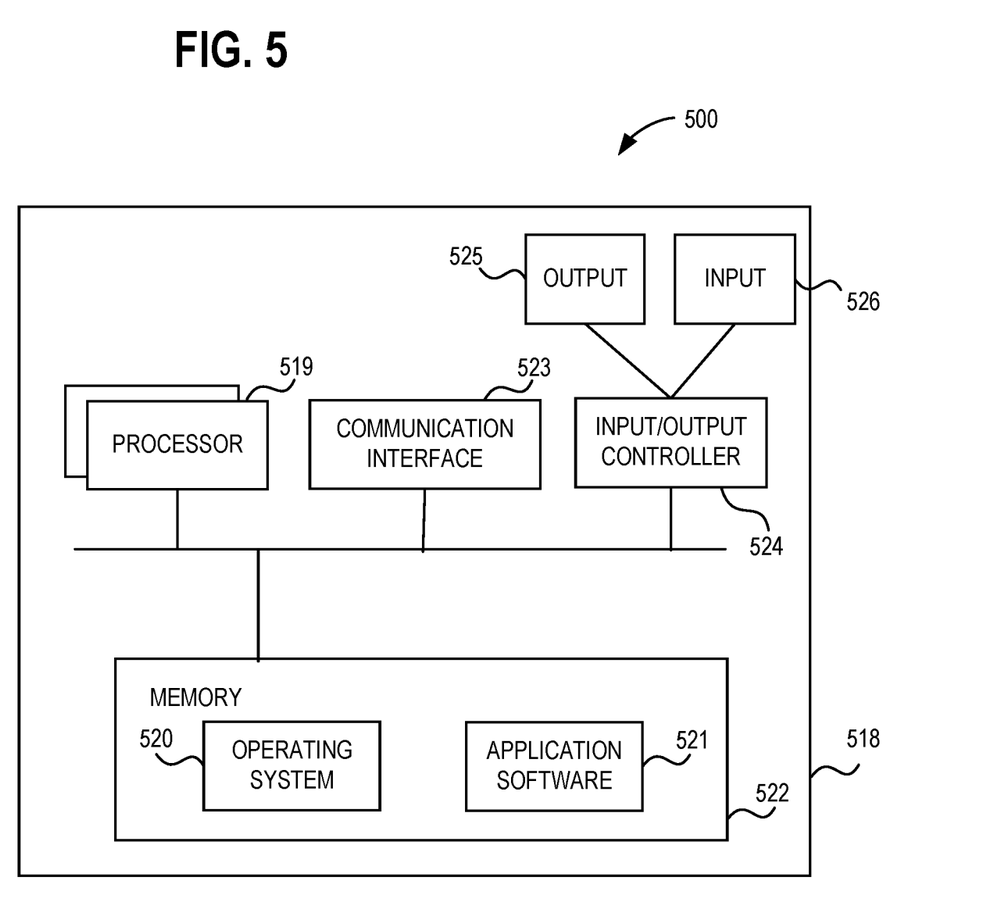
FIG. 5 illustrates a block diagram of a computing apparatus that may be used as a component of the architecture of FIG. 1, according to an example.

The present disclosure is operable with a computing device (computing apparatus) according to an embodiment shown as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hardcoded machine. Platform software comprising an operating system 520 or any other suitable platform software may be provided on computing apparatus 518 to enable application software 521 to be executed on the device. According to an embodiment, the operations as described herein may be accomplished by software, hardware, and/or firmware.

Computer executable instructions may be provided using any computer-readable medium (e.g., any non-transitory computer storage medium) or media that are accessible by the computing apparatus 518. Computer-readable media may include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, non-volatile memory express (NVMe) devices, compact disc (CD, CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone, or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, NVMe devices, persistent memory devices, DVDs, CDs, floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method of optimizing file access, the method comprising:
   identifying a file access event for a first file;
   based on at least the identified file access event, incrementing a value of a first access counter, that stores a count of file access events of the first file, in an access list in a memory, the access list comprising a plurality of access counters, that store a count of file access events for a plurality of accessed files, the plurality of access counters including the first access counter;
   exporting the first access counter to a performance monitoring dashboard;
   displaying the incremented value of the first access counter; based on at least the incremented value of the first access counter, moving the first file between a first storage and a second storage;
   determining whether:
   the incremented value of the first access counter meets a first threshold; or
   a sum of values of the plurality of access counters for the plurality of accessed files meets a second threshold; and
   based on at least the value of the first access counter for the first file meeting the first threshold, or the sum of values of the plurality of access counters for the plurality of accessed files meeting the second threshold, persisting the plurality of access counters on a storage media.

2. The method of claim 1, further comprising:
   adjusting the first threshold or the second threshold to balance a load of persisting the plurality of access counters on the storage media versus a risk of losing the access list in the memory; and
   monitoring, with a machine learning (ML) component, the balancing of the load burden, wherein adjusting the first threshold or the second threshold comprises adjusting the first threshold or the second threshold with the ML component.

3. The method of claim 1, further comprising:
   determining whether a computing apparatus is shutting down; and
   based on at least the computing apparatus shutting down, persisting the plurality of access counters on the storage media.

4. The method of claim 1, further comprising:
   based on at least the value of the first access counter meeting the first threshold, performing a load balancing operation for an application accessing the first file.

5. The method of claim 1, further comprising:
   based on at least the value of the first access counter meeting the first threshold, or the sum of values of the plurality of access counters for the plurality of accessed files meeting the second threshold, generating a security alert.

6. The method of claim 1, further comprising:
   determining whether the file access event for the first file comprises a file deletion; and
   based on at least the file access event for the first file comprising a file deletion, removing the first access counter from the access list.

7. The method of claim 1, further comprising:
   storing a user identification or a count of file access denials or both in the access list.

8. A computer system comprising:
   a processor; and
   a non-transitory computer readable medium having stored thereon program code, the program code causing the processor to:
   identify a file access event for a first file;
   based on at least the identified file access event, increment a value of a first access counter, that stores a count of file access events of the first file, in an access list in a memory, the access list comprising a plurality of access counters, that store a count of file access events for a plurality of accessed files, the plurality of access counters including the first access counter;
   export the first access counter to a performance monitoring dashboard;
   display the incremented value of the first access counter;
   based on at least the incremented value of the first access counter, move the first file between a first storage and a second storage;
   determine whether:
   the incremented value of the first access counter meets a first threshold; or
   a sum of values of the plurality of access counters for the plurality of accessed files meets a second threshold; and
   based on at least the value of the first access counter for the first file meeting the first threshold, or the sum of values of the plurality of access counters for the plurality of accessed files meeting the second threshold, persist the plurality of access counters on a storage media.

9. The computer system of claim 8, wherein the program code is further operative to:
   adjust the first threshold or the second threshold to balance a load of persisting the plurality of access counters on the storage media versus a risk of losing the access list in the memory; and
   monitor, with a machine learning (ML) component, the balancing of the load, wherein adjusting the first threshold or the second threshold comprises adjusting the first threshold or the second threshold with the ML component.

10. The computer system of claim 8, wherein the program code is further operative to:
    determine whether a computing apparatus is shutting down; and
    based on at least the computing apparatus shutting down, persist the plurality of access counters on the storage media.

11. The computer system of claim 8, wherein the program code is further operative to:
    based on at least the value of the first access counter meeting the first threshold, perform a load balancing operation for an application accessing the first file.

12. The computer system of claim 8, wherein the program code is further operative to:
    based on at least the value of the first access counter meeting the first threshold, or the sum of values of the plurality of access counters for the plurality of accessed files meeting the second threshold, generate a security alert.

13. The computer system of claim 8, wherein the program code is further operative to:
    determine whether the file access event for the first file comprises a file deletion; and
    based on at least the file access event for the first file comprising a file deletion, remove the first access counter from the access list.

14. The computer system of claim 8, wherein the program code is further operative to: store a user identification or a count of file access denials or both in the access list.

15. A non-transitory computer storage medium having stored thereon program code executable by a processor, the program code embodying a method comprising: identifying a file access event for a first file;
    based on at least the identified file access event, incrementing a value of a first access counter, that stores a count of file access events of the first file, in an access list in a memory, the access list comprising a plurality of access counters, that store a count of file access events for a plurality of accessed files, the plurality of access counters including the first access counter;
    exporting the first access counter to a performance monitoring dashboard;
    displaying the incremented value of the first access counter;
    based on at least the incremented value of the first access counter
    moving the first file between a first storage and a second storage;
    determining whether:
    the incremented value of the first access counter meets a first threshold; or
    a sum of values of the plurality of access counters for the plurality of accessed files meets a second threshold; and
    based on at least the value of the first access counter for the first file meeting the first threshold, or the sum of values of the plurality of access counters for the plurality of accessed files meeting the second threshold, persisting the plurality of access counters on a storage media.

16. The computer storage medium of claim 15, wherein the program code further comprises:
    adjusting the first threshold or the second threshold to balance a load of persisting the plurality of access counters on the storage media versus a risk of losing the access list in the memory; and
    monitoring, with a machine learning (ML) component, the balancing of the load, wherein adjusting the first threshold or the second threshold comprises adjusting the first threshold or the second threshold with the ML component.

17. The computer storage medium of claim 15, wherein the program code further comprises:
    determining whether a computing apparatus is shutting down; and
    based on at least the computing apparatus shutting down, persisting the plurality of access counters on the storage media.

18. The computer storage medium of claim 15, wherein the program code further comprises:
    based on at least the value of the first access counter meeting the first threshold, performing a load balancing operation for an application accessing the first file.

19. The computer storage medium of claim 15, wherein the program code further comprises:

based on at least the value of the first access counter meeting the first threshold, or the sum of values of the plurality of access counters for the plurality of accessed files meeting the second threshold, generating a security alert.

20. The computer storage medium of claim 15, wherein the program code further comprises:

determining whether the file access event for the first file comprises a file deletion; and based on at least the file access event for the first file comprising a file deletion, removing the first access counter from the access list.

* * * * *